No. 792,114. Patented June 13, 1905.

UNITED STATES PATENT OFFICE.

WILLIAM N. BLAKEMAN, JR., OF NEW YORK, N. Y.

PAINT AND PROCESS OF MAKING SAME.

SPECIFICATION forming part of Letters Patent No. 792,114, dated June 13, 1905.

Application filed August 18, 1904. Serial No. 221,202.

*To all whom it may concern:*

Be it known that I, WILLIAM N. BLAKEMAN, Jr., a citizen of the United States, and a resident of the borough of Manhattan, in the city, county, and State of New York, have invented a new and useful Paint Compound or Mixture and Process of Making the Same, which invention is fully set forth in the following specification.

The object of this invention is to produce an economical and quick-drying paint compound; and the invention consists in the use in such compound of an oil which has been elaidinized by being subjected to the action of an oxid or oxygen acid of nitrogen, as hereinafter described.

In carrying out my invention I first elaidinize an oil or fat by subjecting it to the action of an oxid of nitrogen, and for this purpose any of the oxids of nitrogen, including the oxygen acids, may be used either separately or in mixture. I prefer to use either the protoxid, the trioxid, also known as "nitrous acid" and "nitrous-acid anhydrid," or the red fumes of fuming nitric acid, also known as "red nitric acid."

Selecting linseed-oil as the oil to be elaidinized I subject it in a tall column to the action of the red fumes of fuming nitric acid until saturation is reached, washing thoroughly, if necessary. I then incorporate about one or two per cent. of this fully-elaidinized oil with commercial linseed, cotton, or other oil which is to be used as a vehicle, adding, if desired, another drying-oil to the mixture. I then grind in this mixture any desired pigment, hydrated or anhydrous, and add a commercial or other liquid drier and a very satisfactory and quick-drying paint will be produced. In elaidinizing the oil the fumes of the nitric acid may act in some cases with such energy as to cause immediate flocks, and I have found that this can be largely prevented and a more even reaction obtained by first partially elaidinizing the oil by subjecting it to the action of nitrous-acid anhydrid until a perceptible deepening of color is apparent and then completing the elaidinizing by subjecting the oil to the red fumes of fuming nitric acid. A more satisfactory result will be produced if the oil vehicle with which the fully-elaidinized oil is incorporated is itself partially elaidinized. Thus, for example, I take a portion of cotton-oil and submit it in a tall column to the action of nitrous-acid anhydrid in fine bubbles until the oil is partially elaidinized, as shown by a slight deepening of color. I then submit another portion of cotton-oil to the red fumes of fuming nitric acid until saturation is reached. By combining ten per cent. of the fully-elaidinized cotton-oil with seventy-five per cent. of the partially-elaidinized cotton-oil and adding fifteen per cent. of a drying-oil—say tung-oil—and then grinding in this mixture one hundred to one hundred and twenty parts of zinc oxid, or two hundred and forty parts of lead sulfate, or thirty parts each of zinc oxid, lead sulfate, and barium sulfate a paint will be produced which (with the usual quantity of commercial liquid drier added) will follow the brush in a smooth, uniform, and homogeneous film and will dry in the sun in from fifteen to thirty minutes or in the shade from two to three hours, winter or summer, and indurate to a satifactory cover for all material upon which it is laid.

Instead of or in addition to partially elaidinizing the cotton-oil it may be oxidized by heating on ten or fifteen per cent. of manganese black oxid to 260° or 280° Fahrenheit, and then the fully-elaidinized cotton-oil and the tung-oil may be added with the same ultimate effects. In fact, any of the oils employed in carrying out my invention may, if it be found advisable, be first oxidized and then elaidinized, or vice versa, the object of the preliminary step being to make the oil more susceptible to the succeeding reaction and to produce a more energetic compound.

An oil which has been partially elaidinized or oxidized and partly elaidinized may be used as a vehicle without the addition of any other oil; but such vehicle will be found slow in drying compared with the vehicle previously described.

Any of the drying fatty oils, the non-drying fatty oils, or the rosin oils may be treated with an oxid of nitrogen in carrying out my invention. I have so treated olive, castor, cotton, sunflower, ben or sesame, linseed, tung, and rosin oils, and by the use of the terms "elaidinize," "elaidinized," and "elaidinizing" in this specification and in the claims I intend to include the process (and its resulting product) of treating any of the substances named with an oxid of nitrogen. Any of the fatty oils mentioned may be used as vehicles; but cotton, sunflower, and corn oils will be found the most economical, and if it be desired to add a drying-oil to the compound either raw linseed-oil, boiled linseed-oil, or tung, or Chinese wood-oil may be used. A commercial liquid drier or other drier may also be added, if desired.

The elaidinizing of the oil may be carried out in any manner dictated by practice, and heat, pressure, and agitation may be employed at any stage of the process, if found necessary.

The pigments which may be used, either separately or in combination, are white lead, zinc oxid, zinc sulfid, lead sulfate, lead sulfite, lead oxysulfate or sublimed lead, barium sulfate, barium carbonate, calcium carbonate, strontium sulfate, strontium carbonate, and the like. I prefer to use zinc oxid, lead sulfate, or lead oxysulfate, either separately or in combination, as the use of these pigments, especially with an elaidinized cotton-oil vehicle, with tung-oil added, will form a very economical and quick-drying compound, and the elaidinized oil will be found to impart to these and other anhydrous pigments the characteristic of spreading power which they lack.

The proper proportions of oils and pigments can be easily determined in practice and will vary with their character.

I do not herein claim by itself an elaidinized-oil vehicle, as the same is claimed in another application filed herewith, Serial No. 221,201.

Having thus fully described my invention, I claim—

1. As a new composition of matter, a compound or mixture of an elaidinized non-drying fatty oil and a pigment.

2. As a new composition of matter, a compound or mixture of an elaidinized non-drying fatty oil, a pigment and a drier.

3. As a new composition of matter, a compound or mixture of an elaidinized non-drying fatty oil, and an anhydrous pigment.

4. As a new composition of matter, a compound or mixture of an oil; an elaidinized oil; and a pigment.

5. As a new composition of matter, a compound or mixture of an oil; an elaidinized oil; a pigment; and a drier.

6. As a new composition of matter, a compound or mixture of a non-drying fatty oil; an elaidinized oil; and a pigment.

7. As a new composition of matter, a compound or mixture of an elaidinized oil; another oil, also elaidinized; and a pigment.

8. As a new composition of matter, a compound or mixture of an elaidinized oil; another oil also elaidinized; a pigment; and a drier.

9. As a new composition of matter, a compound or mixture of a partially-elaidinized non-drying fatty oil; a fully-elaidinized non-drying oil; and a pigment.

10. As a new composition of matter, a compound or mixture of an oil; an elaidinized oil; a drying-oil; and a pigment.

11. As a new composition of matter, a compound or mixture of a non-drying fatty oil; an elaidinized oil; a drying-oil; and a pigment.

12. A compound or mixture of an elaidinized oil; tung-oil; and a pigment.

13. A compound or mixture of an elaidinized fatty oil; tung-oil; and a pigment.

14. As a new composition of matter, a compound or mixture of an elaidinized non-drying fatty oil; tung-oil; and a pigment.

15. As a new composition of matter, a compound or mixture of a non-drying fatty oil; an elaidinized oil; tung-oil; and a pigment.

16. As a new composition of matter, a compound or mixture of a non-drying fatty oil; an elaidinized non-drying fatty oil; tung-oil; and a pigment.

17. As a new composition of matter, a compound or mixture of a partly-elaidinized non-drying fatty oil; a fully-elaidinized non-drying fatty oil; tung-oil; and a pigment.

18. As a new composition of matter, a compound or mixture of an oxidized and elaidinized oil and a pigment.

19. As a new composition of matter, a compound or mixture of an oxidized and elaidinized oil, a pigment, and a drier.

20. As a new composition of matter, a compound or mixture of an oxidized and elaidinized non-drying fatty oil, and a pigment.

21. As a new composition of matter, a compound or mixture of an oxidized and elaidinized non-drying fatty oil, a pigment and a drier.

22. As a new composition of matter, a compound or mixture of an oxidized and elaidinized oil, and an anhydrous pigment.

23. As a new composition of matter, a compound or mixture of an oxidized and elaidinized oil, an anhydrous pigment, and a drier.

24. As a new composition of matter, a compound or mixture of an oxidized and elaidinized non-drying fatty oil, and an anhydrous pigment.

25. As a new composition of matter, a compound or mixture of an oxidized and elaidinized non-drying fatty oil, an anhydrous pigment and a drier.

26. As a new composition of matter, a compound or mixture of elaidinized cotton-oil and a pigment.

27. As a new composition of matter, a compound or mixture of elaidinized cotton-oil, another oil, and a pigment.

28. As a new composition of matter, a compound or mixture of elaidinized cotton-oil, tung-oil, and a pigment.

29. As a new composition of matter, a compound or mixture of elaidinized cotton-oil; tung-oil; another oil; and a pigment.

30. The process herein described, which consists in first subjecting an oil to the action of an oxid of nitrogen, and then grinding a pigment therein.

31. The process herein described, which consists in first subjecting a non-drying fatty oil to the action of an oxid of nitrogen, and then grinding a pigment therein.

32. The process herein described, which consists in first subjecting an oil to the action of an oxid of nitrogen and then grinding therein an anhydrous pigment.

33. The process herein described, which consists in first subjecting a non-drying fatty oil to the action of an oxid of nitrogen and then grinding therein an anhydrous pigment.

34. The process herein described which consists in elaidinizing an oil, mixing it with another oil, and grinding a pigment in this mixture.

35. The process herein described, which consists in elaidinizing a non-drying fatty oil mixing it with another oil and grinding a pigment in this mixture.

36. The process herein described which consists in elaidinizing a non-drying fatty oil, mixing it with tung-oil and grinding a pigment in this mixture.

37. The process herein described, which consists in elaidinizing cotton-oil, mixing it with another oil and grinding a pigment in the mixture.

38. The process herein described, which consists in elaidinizing cotton-oil, mixing it with tung-oil and grinding a pigment in the mixture.

39. The process herein described, which consists in oxidizing an oil and also subjecting it to the action of an oxid of nitrogen and then grinding a pigment therein.

40. The process herein described, which consists in oxidizing a non-drying fatty oil and also subjecting it to the action of an oxid of nitrogen, and then grinding a pigment therein.

41. The process herein described, which consists in oxidizing an oil and also subjecting it to the action of an oxid of nitrogen, and then grinding therein an anhydrous pigment.

42. The process herein described which consists in oxidizing a non-drying fatty oil and also subjecting it to the action of an oxid of nitrogen, and then grinding therein an anhydrous pigment.

WM. N. BLAKEMAN, JR.

Witnesses:
FRANCIS P. REILLY,
MABEL O. FAHNESTOCK.